United States Patent Office 3,517,385
Patented June 23, 1970

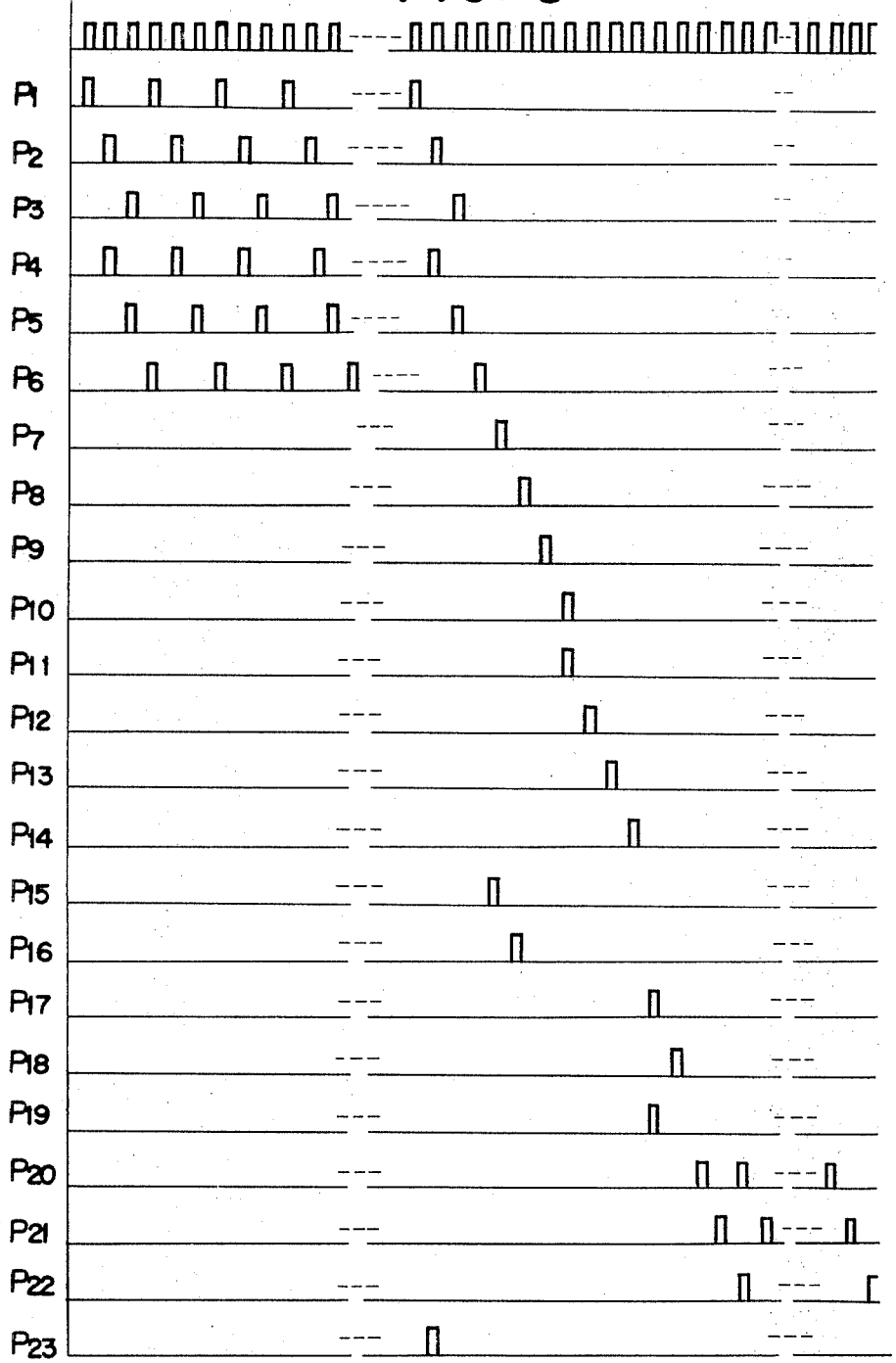

3,517,385
CODE CHECKING SYSTEMS
Sumio Katsuragi, Yokohama-shi, Japan, assignor to Tokyo Shibaura Electric Co., Ltd., Kawasaki-shi, Japan, a corporation of Japan
Filed Oct. 26, 1967, Ser. No. 678,315
Claims priority, application Japan, Oct. 31, 1966, 41/71,513
Int. Cl. G06f 11/10
U.S. Cl. 340—146.1                                    7 Claims

ABSTRACT OF THE DISCLOSURE

In a code checking system wherein, in transmitting information represented by a series of characters or digits, the characters or digits are encoded and check digits are added to the encoded information. There is provided a converting means adapted to convert respective characters and ambiguous characters into predetermined corresponding digits and to successively supply said digits on the output side, a coefficient generating means to successively generate predetermined coefficients corresponding to respective orders of the digit series generated on the output side of the converting means, a weight sum calculating means to calculate the weight sum of the coefficient series generated by the coefficient generating means and the digits series generated by the converting means by utilizing a predetermined prime number as the modulus, and means to restore and read erroneous characters or ambiguous characters by using the result of calculation of the weight sum calculating means.

---

This invention relates to a code checking system and more particularly to a new and improved system of detecting and correcting errors in information consisting of a series of digits generally represented by an $n$-ary system ($n$ being an integer) of a series or train of alphabets, Japanese characters or Chinese characters during the transmission thereof.

With recent advance of the digital technique, detections and corrections of errors in information comprising a series of codes represented by binary codes during the transmission thereof are effected by a simple parity check system or a Hamming code system or the like. However, with regard to checking of information consisting of a digit series other than the binary system, for example, the decimal system or information consisting of a series of common characters, no satisfactory checking system is available until present. This is because that at the present stage of development in the digital technique, conventional checking systems for binary systems are sufficient for the purpose because whatever the type of $n$-ary systems may be, it can be represented by coded numerals according to the binary system. However, the recent development of optical or magnetic character reading apparatus requires to directly treat as information decimal numerals, alphabets, Japanese characters or other characters that are not converted into binary codes. These apparatus are characterized in that, in addition to the occurrence of errors, incapability of recognition (reading) occurs at a higher probability of one or several orders of magnitudes. As a result, one or more characters in a series of characters are rejected as ambiguous. For example, if the rate of rejection per one character of an optical character reading apparatus is selected to be 0.1% when reading a series of characters arranged in lines each containing $n$ characters, the probability of rejection per line becomes $1-999^n$. When it is assumed that $n=10$, then this value will be equal to approximately 0.01.

In other words, rejection of reading occurs at a rate of once per 100 lines. If it were possible to recover one character that is incapable of being read in each line, the rejection rate would be, roughly speaking, reduced to about $4.0 \times 10^{-5}$ under the same rejection rate per character, whereas if it were possible to restore up to two characters per line, said rate would be reduced to the order of $1.0 \times 10^{-7}$. In other words, only one character that is incapable of being read would occur per ten millions lines so that practically eliminating occurrence of characters which are impossible to read.

An object of this invention is to provide a code checking system which can recover rejected characters that are incapable of recognition, and can detect and correct errors by dividing information comprising a series of characters into lines each contacting a definite number of characters and by adding a minimum number of checking characters to each line.

According to this invention there is provided a code checking system comprising means to generate a series of codes of any type consisting of a combination of different codes respectively corresponding to $p$-integers from zero to $p-1$ inclusive, where $p$ represents a prime number of more than 3, said series of codes corresponding to said series of integers, a coefficient generating circuit for generating a predetermined number of sets of coefficients corresponding to each sequential order of said series of integers generated, means to calculate a weighted sum utilizing said prime number $p$ of said series of numerals as a modulus, and means to compare the result of calculation of said calculating means with a preset value, the comparing means operating to recover erroneous codes or rejected codes in accordance with said calculated result when said result of calculation and said preset value do not coincide.

The features of the invention which are believed to be novel are set forth with particularity in the appended claims. The invention itself, however, as to its organization together with further objects and advantages thereof, may best be understood by reference to the following description taken in connection with the accompanying drawings, in which:

FIG. 3 is a pulse chart of timing pulses to be utilized in the system of this invention;

Figure 1:
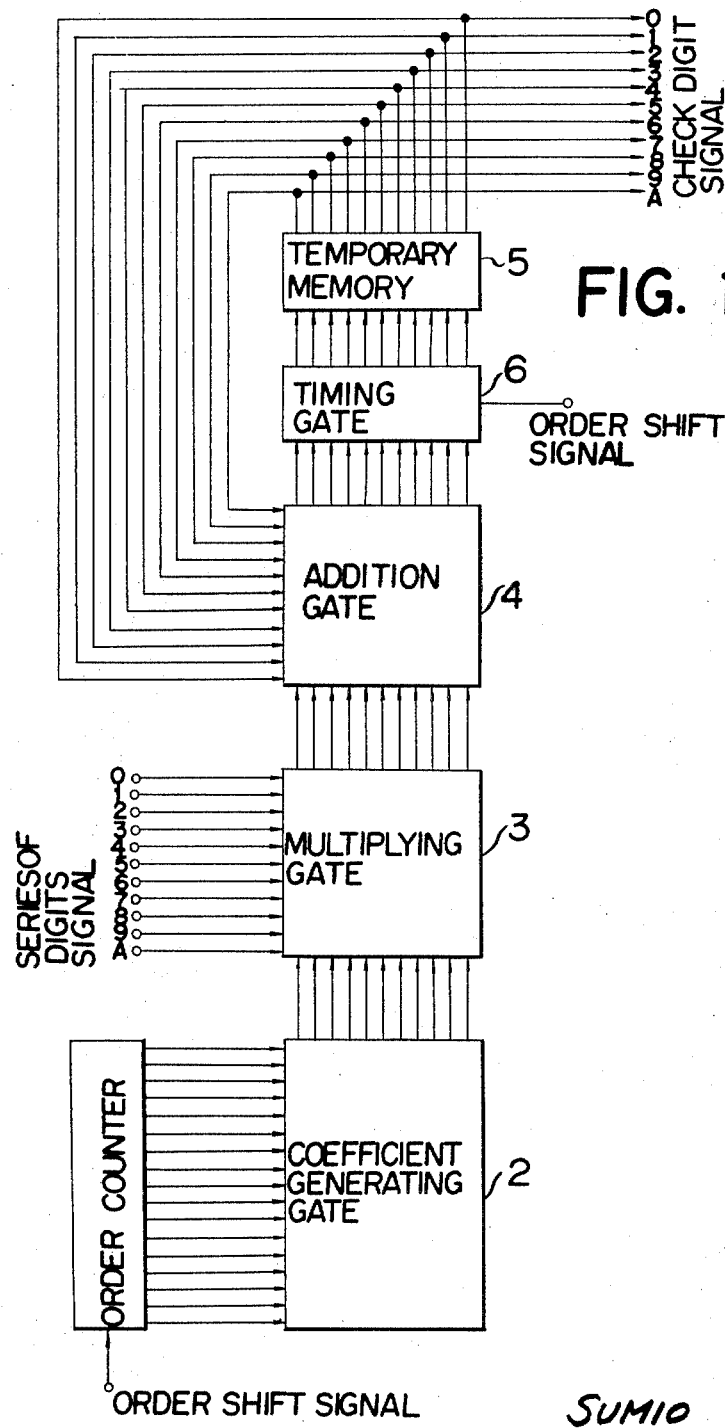
FIG. 1 illustrates a block diagram of a circuit for forming checking codes according to the code checking system of this invention.

The principle of the novel code checking system will be considered by taking a case as an example wherein a line comprising one section of an information is comprised of a series of 15 decimal digits as shown in Table 1.

TABLE 1

| Order | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Digit series | 6 | 3 | 4 | 9 | 2 | 2 | 9 | 0 | 6 | 0 | 8 | 8 | 3 | 6 | 6 | 8 |

In the conventional parity check system for a binary series, "1" or "0" is added to the series as redundant check bits according to whether the number of "1's" constituting the information is even or odd. This corresponds to calculating the sum of the numerical values "0" and "1" in the binary series by utilizing 2 as the modulus. This method can be extended to the case of a decimal system wherein as the check digit is selected a ten's complement of a sum (the remainder obtainable by dividing the sum by 10) of respective numerical values of one line by utilizing 10 as the modulus. In Table 1 the 16th order is the check digit. Since the sum of the numerical values of the digit series from the first to 15th orders equals 72 the result of calculation of this value by taking 10 as the modulus is equal to 2 and the complement of 10 for 2 is 8 which is represented in the last column of Table 1. The sum of total values including the check digit thus obtained would be a multiple of 10 or 0 when taking 10 as the modulus. Upon occurrence of an error in one portion of this digit series the sum of the total numbers would not be 0 when taking 10 as the modulus so that it becomes possible to detect such an error. In this case, however, since it is impossible to detect the position of erroneous digits, correction thereof is impossible. In a case where any one of the digits in a series can not be recognized and is rejected, but where the position thereof can be detected, it is possible to correct the error, since the ten's complement of the sum of whole numerical values except the rejected digit obtained by utilizing 10 as the modulus will represent the digit which is rejected. Table 2 shows an example wherein the digit of ninth order is rejected and the sum of all digits except this order is 74. Since the value of 74 obtained by calculating with 10 as the modulus equals 4, the complement of 10 to 6 which is the digit of the ninth order to be determined.

TABLE 2

| Order | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Digit series | 6 | 3 | 4 | 9 | 2 | 2 | 9 | 0 | ? | 0 | 8 | 8 | 3 | 6 | 6 | 8 |

The above description refers to a checking system to recover a rejected digit where the number of rejected digits is only one. In order to recover more than one rejection, the number of additional check digits must be increased. Table 3 shows an example utilizing three check digits.

TABLE 3

| Order | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Digit series | 6 | 3 | 4 | 9 | 2 | 2 | 9 | 0 | 6 | 0 | 8 | 8 | 3 | 6 | 6 | 8 | 6 | 5 |
| Coefficient Series I | 1 | 1 | 1 | 1 | 1 | 1 | 1 | 1 | 1 | 1 | 1 | 1 | 1 | 1 | 1 | | | |
| Coefficient Series II | 1 | 2 | 3 | 4 | 5 | 6 | 7 | 8 | 9 | 0 | 1 | 2 | 3 | 4 | 5 | 6 | | |
| Coefficient Series III | 0 | 0 | 0 | 0 | 0 | 0 | 0 | 0 | 0 | 1 | 1 | 1 | 1 | 1 | 1 | 1 | 1 | |

The first check digit $C_1$ (16th order) is determined by a simple sum of the digit series by utilizing 10 as the modulus, similar to the above-mentioned cases. In other words, this value corresponds to a value obtained by calculating a ten's complement of a remainder obtained by dividing the sum of the digits series (weighted sum) which are the products of respective numerical values of the 1st to 15th orders and "1" by utilizing 10 as the modulus. The digits series 1 corresponding to each of the orders is termed as the coefficient series I. The second check digit $C_2$ (17th order) is obtained as the ten's complement of the remainder obtained by dividing the weighted sum of the coefficient series II and the digit series with 10, wherein said weighted sum is obtained by arithmetically summing each of the products calculated by multiplying respective values of the coefficient series II by respective values of the digit series including 16th order of the first check digit $C_1$, respectively corresponding to the orders of said values of the coefficient series II. (Hereinafter the term weighted sum means the above-mentioned calculation, and the remainder obtained as above-described as, for example, the weighted sum of the coefficient series II and the digit series by utilizing 10 as modulus. Similarly the third check digit $C_3$ (18th order) is determined by the weighted sum of the coefficient series III corresponding to the 1st to 17th orders.

It is assumed now that during transmission of the digit series to which three check digits $C_1$, $C_2$ and $C_3$ determined as above-described have been added, the second and ninth orders are rejected. If these unknown digits are expressed by $x$ and $y$, respectively, the following equations can be obtained from the first and second check digits $C_1$ and $C_2$.

$$x+y \equiv 10-(6+4+9+2+2+9+0+0+8+8+3+6+6+8) \bmod 10$$
$$\equiv 9 \bmod 10,$$

$$2x+9y \equiv 10-(1 \cdot 6+3 \cdot 4)+4 \cdot 9+5 \cdot 2+6 \cdot 2+7 \cdot 9$$
$$+8 \cdot 0+0 \cdot 0+1 \cdot 8+2 \cdot 8+3 \cdot 3+4 \cdot 6+5 \cdot 6$$
$$+6 \cdot 8+6) \bmod 10 \equiv 0 \bmod 10$$

Since $x=3$, and $y=6$, satisfy these equations, these values are interpreted as rejected digits. In this case, however, there may occour a case wherein it is impossible to recover the rejected digits at two positions. For example, let digits of the first and sixth orders be rejected as shown in Table 4.

TABLE 4

| Order | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Digit series | ? | 3 | 4 | 9 | 2 | ? | 9 | 0 | 6 | 0 | 8 | 8 | 3 | 6 | 6 | 8 | 6 | 5 |

By denoting these unknown digits by $x$ and $y$, we can obtain the following equations similar to the above case, 131—15

$$x+y \equiv 10-(3+4+ \ldots +6+8) \bmod 10$$
$$\equiv 8 \bmod 10,$$
$$x+6y \equiv 10-(3 \cdot 2+4 \cdot 3+ \ldots 6 \cdot 5+8 \cdot 6+6) \bmod 10$$
$$\equiv 8 \bmod 10.$$

There are two solutions $x=6$, $y=2$ and $x=8$, $y=0$ for these equations, which means that unique recovering of the rejection is not possible. Such a case can occur irrespective of the coefficient series. When the coefficients are chosen in a general way, simultaneous equations for unknown digits are given by $$ax+by \equiv l \bmod 10$$
$$cx+dy \equiv f \bmod 10$$

By subtraction, $$(ad-cb)x \equiv ld-fb \bmod 10$$

By modifying this equation by putting $ad-cb \equiv m$, $ld-fb \equiv n$, $mx \equiv n \bmod 10$.

Values of $x$ satisfying the above equation for various values of $m$ and $n$ are shown in Table 5.

TABLE 5

| | n | | | | | | | | | |
|---|---|---|---|---|---|---|---|---|---|---|
| m | 0 | 1 | 2 | 3 | 4 | 5 | 6 | 7 | 8 | 9 |
| 1 | 0 | 1 | 2 | 3 | 4 | 5 | 6 | 7 | 8 | 9 |
| 2 | 0 | | 1, 6 | | 2, 7 | | 3, 8 | | 4, 9 | |
| 3 | 0 | 7 | 4 | 1 | 8 | 5 | 2 | 9 | 6 | 3 |
| 4 | 0, 5 | | 3, 8 | | 1, 6 | | 4, 9 | | 2, 7 | |
| 5 | 0, 2, 4, 6, 8 | | | | | | 1, 3, 5, 7, 9 | | | |
| 6 | 0, 5 | | 2, 7 | | 4, 9 | | 1, 6 | | 3, 8 | |
| 7 | 0 | 3 | 6 | 9 | 2 | 5 | 8 | 1 | 4 | 7 |
| 8 | 0, 5 | | 4, 9 | | 3, 8 | | 2, 7 | | 1, 6 | |
| 9 | 0 | 9 | 8 | 7 | 6 | 5 | 4 | 3 | 2 | 1 |

In the above Table 5, more than one numeral is degenerated in the same place. They can not be distinguished from each other even if $n$ and $m$ are given. On the other hand, blanks show that $x$ satisfying such cases does not exist, so that they do not contribute to recovering the unknown digits. Such shall be also the case when the correction of errors is carried out.

Thus the determination of check digits by calculation using 10 as the modulus is shown to be defective. To solve the $m$, according to this invention, determination of check digits is made by using a particular prime number larger than 10 in the decimal system as the modulus thus enabling restoration of erroneous or rejected characters to readable condition.

Among prime numbers larger than 10, 11 is the minimum, so that the following description relates to the use of this digit. In this case, if desired in order to represent check digits by 11-nary system, one character corresponding to 10 is newly added to digits 0 to 9, said character being represented by A in the following description.

TABLE 6

| Order | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Digit series | 6 | 3 | 4 | 9 | 2 | 2 | 9 | 0 | 6 | 0 | 8 | 8 | 3 | 6 | 6 | 5 | 3 | 5 |
| Coefficient series I | 1 | 1 | 1 | 1 | 1 | 1 | 1 | 1 | 1 | 1 | 1 | 1 | 1 | 1 | 1 | 1 | | |
| Coefficient series II | 1 | 2 | 3 | 4 | 5 | 6 | 7 | 8 | 9 | 0 | 1 | 2 | 3 | 4 | 5 | 6 | | |
| Coefficient series III | 0 | 0 | 0 | 0 | 0 | 0 | 0 | 0 | 0 | 1 | 1 | 1 | 1 | 1 | 1 | 1 | | |

In Table 6, the same digit series and coefficient series identical to those shown above are used to determine the first to third check digits $C_1$, $C_2$ and $C_3$ shown in 16th to 18th orders. Since the manner of determining them is identical to that described above it is believed unnecessary to describe it again.

Thus each check digit is determined such that the weight sum of the digit series including all digits up to the preceding order becomes zero when 11 is used as the modulus.

Examples of recovery of rejected characters in informations consisting of a digit series to which selected check digits have been added in the manner described above and detection as well as correction of errors are enumerated as follows:

(1) Recovery of one rejected digit: In this case, the sum of all digits from the 1st to 16th orders excluding the rejected digit but including the first check digit is calculated by utilizing 11 as the modulus and then the complement of 11 thereof is obtained. The complement respesents the ambiguous digit sought.

(2) Recovery of two rejected digits: Suppose that the digits of the first and sixth orders are ambiguous and represented by $x$ and $y$, respectively. By utilizing the first and the second check digits, we obtain, $$x+y \equiv 11-(3+4+ \ldots 6+6+5) \bmod 11$$
$$\equiv 11-69 \bmod 11$$
$$\equiv 8 \bmod 11,$$
$$x+6y \equiv 11-(2\cdot3+3\cdot4+ \ldots 5\cdot6+6\cdot5+3) \bmod 11$$
$$\equiv 11-301 \bmod 11$$
$$\equiv 7 \bmod 11.$$

By subtraction, $$5y \equiv 1 \bmod 11 - 8 \bmod 11$$
$$\equiv 10 \ (=A) \bmod 11.$$

From this we obtain $y=2$, and by substituting this value of $y$ into the preceding equation we obtain $x=6$.

Table 7 below shows values of $x$ for various values of $m$ and $n$ which satisfy an equation $$mx = n \bmod 11$$

which is obtained when the check digit is determined by utilizing not 10 but 11 as the modulus in the similar manner as in the foregoing case. This table shows that no duplication or absence of the value of $x$ occurs as in Table 5. Thus the possibility of recovering one or two rejected digits is assured for all cases.

TABLE 7

The values of $x$ that satisfy $mx=n \bmod 11$

| m | n | | | | | | | | | | |
|---|---|---|---|---|---|---|---|---|---|---|---|
| | 0 | 1 | 2 | 3 | 4 | 5 | 6 | 7 | 8 | 9 | A |
| 1 | 0 | 1 | 2 | 3 | 4 | 5 | 6 | 7 | 8 | 9 | A |
| 2 | 0 | 6 | 1 | 7 | 2 | 8 | 3 | 9 | 4 | A | 5 |
| 3 | 0 | 4 | 8 | 1 | 5 | 9 | 2 | 6 | A | 3 | 7 |
| 4 | 0 | 3 | 6 | 9 | 1 | 4 | 7 | A | 2 | 5 | 8 |
| 5 | 0 | 9 | 7 | 5 | 3 | 1 | A | 8 | 6 | 4 | 2 |
| 6 | 0 | 2 | 4 | 6 | 8 | A | 1 | 3 | 5 | 7 | 9 |
| 7 | 0 | 8 | 5 | 2 | A | 7 | 4 | 1 | 9 | 6 | 3 |
| 8 | 0 | 7 | 3 | A | 6 | 2 | 9 | 5 | 1 | 8 | 4 |
| 9 | 0 | 5 | A | 4 | 9 | 3 | 8 | 2 | 7 | 1 | 6 |
| A | 0 | A | 9 | 8 | 7 | 6 | 5 | 4 | 3 | 2 | 1 |

It is to be noted that inverse values of 1 to A are also given by digits 1 to A, not by fractions as is in the usual arithmetic calculations. More particularly, digits shown in the column designated by $n=1$ represent inverses of respective values of $m$. The value of $x$ that satisfies the above equation is obtained by multiplying $n$ with the inverse of $m$.

(3) Detection of errors when one or two digits and errors are simultaneously rejected. These conditions are detected by the fact that the condition is not satisfied where the weight sum corresponding to three check digits is zero when 11 is utilized as the modulus. More particularly, one or two rejected digits are determined according to the methods described in connection with items (1) and (2) and the result is used to calculate whether the equation for the condition regarding the third check digit holds. If the third equation does not hold, some errors would arise.

(4) Detection and correction of one error. Where one error presents in a digit series, the weight sum corresponding to coefficient series I, II and III by utilizing 11 as the modulus would not be zero. Assuming now that $l$, $m$ and $n$ represent the complements of 11 for the sum and that $dx$ represents the difference between the erroneous value and the correct value, the following equations hold for respective coefficient series, $$dx \equiv l \cdot \bmod 11$$
$$pdx \equiv m \cdot \bmod 11$$
$$qdx \equiv n \cdot \bmod 11$$

where $p$ and $q$ represent values of coefficient series II and III corresponding to positions where error occurred. From these equations $dx$, $p$ and $q$ can be determined and values $p$ and $q$ determine the position of error. The sum of the coefficient values of these positions and $dx$ $(=l)$ as determined by utilizing 11 as the modulus represents the correct digit. For example, suppose that digit "8" of the 12th order in Table 6 was erroneously read as "3." Then, similarly, the following equations hold $$dx = 11-(6+3+4+ \ldots +8+3+3+ \ldots +5)$$
$$+6\cdot5+3) = A \bmod 11$$
$$pdx = 11-(1\cdot6+2\cdot3+ \ldots +1\cdot8+2\cdot3+3\cdot3+ \ldots$$
$$+6\cdot5+3) = A \bmod 11$$
$$qdx = 11-(0+8+3+3+6+6+5+5+5)$$
$$\equiv 5 \bmod 11$$

By deriving $dx=5$ from the first equation and substituting it in the second equation, we obtain $$5p \equiv A(=10) \bmod 11$$

The value that satisfies this equation is $p=2$, as can be found in Table 7. Similarly, from the first and third equations, we can determine that $q=1$. Thus it can be determined that the position of error is located in the 12th order and that the correct value is $3+5=8$.

(5) Detection of more than one error where three equations described in preceding paragraph (4) contradict each other denotes that there are errors in more than one position. Thus for example, if the value of $q$ in paragraph (4) were a value other than 0 and 1, then it means that errors had occurred in more than one position. However, detection of more than one error is not perfect so that there may be a case when it is impossible to detect them. But the probability that the errors are detected can be increased by increasing the number of check digits.

As is easily understood from the above explanation, it is possible with the present checking system to correct one error and to recover one or two rejected digits by selecting two redundant check digits for a digit series of not more than 10 digits, three check digits for a digit series of not more than $11^2 = 121$ and generally $n+1$ check digits for a series of not more than $11^n$ digits when a coefficient series of from 0, 1 ... 9, and A shown in Table 8 is utilized.

TABLE 8

| (Order) 1 2 3 4 5 6 7 8 9 10 11 12 13 14 ... | 115 | 116 | 117 | 118 | $C_1$ | $C_2$ | $C_3$ |
|---|---|---|---|---|---|---|---|
| (Digit series) 3 7 3 6 2 1 5 9 6 4 7 6 0 6 ... | 9 | 4 | 8 | 6 | 1 | 2 | 3 |
| (Coefficient series I) 1 1 1 1 1 1 1 1 1 1 1 1 1 1 ... | 1 | 1 | 1 | 1 | | | |
| (Coefficient series II) 0 1 2 3 4 5 6 7 8 9 A 0 1 2 ... | 4 | 5 | 6 | 7 | 8 | | |
| (Coefficient series III) 0 0 0 0 0 0 0 0 0 0 0 1 1 1 ... | A | A | A | A | A | | |

From this it can be noted that, for a coefficient series of more than $11^{n-1}$ orders but not more than $11^n$ digits, the minimum required information is one digit for correction of a value of one error and is $n$ for locating the position at which the error has occurred. Thus the present checking system supplies the optimal error detecting and correcting system. While in the above-described checking system particular coefficient series were used for coefficient series I, II and III, it should be understood that this invention is not limited to these particular series and that generally, for digit series (including the check digit) of $n$ orders $xi$ (where $i = 1, 2 ... n$), the check digits may be selected such that $l$ equations represented by a general formula $$\sum_{i=1}^{n} aij \times i \equiv c_j \bmod 11 (j = 1, 2 ... l)$$

holds for $nx$ coefficient series $ij$ ($i = 1, 2 ... n$; $j = 1, 2 ... l$) having different column vectors and a constant series $c_j$ ($j = 1, 2 ... l$).

Further, in the foregoing description, examples have been given wherein a series of decimal numbers (from 0 to 9) were used as the information, this invention is also applicable for any series of characters other than numerical series to detect and correct errors and to recover rejected characters.

Thus, generally, for information consisting of $n$ different codes or character series, prime numbers $p$ of equal or more than $n$ are utilized as the modulus and where $p$ is larger than $n$, when desired, new codes or new characters are added to the series to form series containing $p$ characters or codes as a whole. Integers from 0 to $p$ are assigned to respective codes or characters to calculate a weight sum of these integers and coefficient series $aij$ ($i = 1, 2 ... n$; $j = 1, 2 ... l$) comprised by digits having values between 0 and $p-1$ by utilizing $p$ as the modulus, check digits being determined such that the sum satisfies the following equation $$\sum_{i=1}^{n} aij \times i = c_j \bmod p (j = 1, 2 ... l)$$

For example, for a series of alphabets where $n = 26$, among prime numbers larger than 26, the minimum prime number 29 is utilized and special three characters (for example a blank, a period (.) and a comma (,)) are added to provide 29 characters, as a whole. Numerical values of from 0 to 29 are assigned to respective characters, whereby a checking system is provided capable of detecting and correcting errors and of recovering rejected characters just in the same manner as the above explanation in the case of decimal number series. Table 9 shows this example.

TABLE 9

| (order) 1 2 3 4 5 6 7 8 9 10 11 12 13 14 ... 114 115 116 117 118 $C_1$ $C_2$ $C_3$ |
|---|
| (Information series) THERE b I S b N O b E R ... E N C E . S T V |
| (Coefficient series I) A A A A A A A A A A A A A A ... A A A A A |
| (Coefficient series II) b A B C D E F G H I J K L M ... Z , . A B |
| (Coefficient series III) b b b b b b b b b b b b b b ... C C C D D D D |

Having finished describing the principles of the novel code checking system, an embodiment of this invention as applied to character reading apparatus or printing devices such as a typewriter and the like is given hereunder.

FIG. 1 shows the construction of a novel device associated with a printing device such as a typewriter for determining check characters in accordance with this invention. In this example, characters of the typewriter are represented by decimal digits. An order counter 1 functions to count the orders of printed characters and the outputs from this counter are supplied to a coefficient generating gate which operates to generate predetermined coefficients corresponding to respective outputs from the order counter 1 and to supply these coefficients to a multiplying gate 3. The multiplying gate is supplied with output signals from coefficient generating gate 2 and signals representing printed values to calculate the product of these values by utilizing 11 as the modulus. The results of multiplication are supplied to an addition gate 4. Addition gate 4 operates to add the contents in a temporary memory device for the product and sum 5 to the output from the multiplying gate 3 whereby to rewrite the content of the temporary memory device for the product and sum via a timing gate which is enabled and disabled at each time of order shift. The temporary memory device 5 is always set to "0" when each one of lines is commenced which are divided for a predetermined number of digit series comprising the information so that upon completion of printing of each line the value of the weight as shown in Tables 10 and 11.
sum of the digit series and the coefficient series utilizing 11 as the modulus may be obtained. It is possible to obtain a signal corresponding to the desired check digit by obtaining the complement of the output from the temporary memory device for the product and sum. The multiplying gate 3 and the addition gate 4 include circuits that generate outputs corresponding to inputs $m$ and $n$

TABLE 10

Values of $m \times n$ (mod 11)

| | | | | | $n$ | | | | | | |
|---|---|---|---|---|---|---|---|---|---|---|---|
| $m$ | 0 | 1 | 2 | 3 | 4 | 5 | 6 | 7 | 8 | 9 | A |
| 0 | 0 | 0 | 0 | 0 | 0 | 0 | 0 | 0 | 0 | 0 | 0 |
| 1 | 0 | 1 | 2 | 3 | 4 | 5 | 6 | 7 | 8 | 9 | A |
| 2 | 0 | 2 | 4 | 6 | 8 | A | 1 | 3 | 5 | 7 | 9 |
| 3 | 0 | 3 | 6 | 9 | 1 | 4 | 7 | A | 2 | 5 | 8 |
| 4 | 0 | 4 | 8 | 1 | 5 | 9 | 2 | 6 | A | 3 | 7 |
| 5 | 0 | 5 | A | 4 | 9 | 3 | 8 | 2 | 7 | 1 | 6 |
| 6 | 0 | 6 | 1 | 7 | 2 | 8 | 3 | 9 | 4 | A | 5 |
| 7 | 0 | 7 | 3 | A | 6 | 2 | 9 | 5 | 1 | 8 | 4 |
| 8 | 0 | 8 | 5 | 2 | A | 7 | 4 | 1 | 9 | 6 | 3 |
| 9 | 0 | 9 | 7 | 5 | 3 | 1 | A | 8 | 6 | 4 | 2 |
| A | 0 | A | 9 | 8 | 7 | 6 | 5 | 4 | 3 | 2 | 1 |

TABLE 11

Values of $m + n$ (mod 11)

| | | | | | $n$ | | | | | | |
|---|---|---|---|---|---|---|---|---|---|---|---|
| $m$ | 0 | 1 | 2 | 3 | 4 | 5 | 6 | 7 | 8 | 9 | A |
| 0 | 0 | 1 | 2 | 3 | 4 | 5 | 6 | 7 | 8 | 9 | A |
| 1 | 1 | 2 | 3 | 4 | 5 | 6 | 7 | 8 | 9 | A | 0 |
| 2 | 2 | 3 | 4 | 5 | 6 | 7 | 8 | 9 | A | 0 | 1 |
| 3 | 3 | 4 | 5 | 6 | 7 | 8 | 9 | A | 0 | 1 | 2 |
| 4 | 4 | 5 | 6 | 7 | 8 | 9 | A | 0 | 1 | 2 | 3 |
| 5 | 5 | 6 | 7 | 8 | 9 | A | 0 | 1 | 2 | 3 | 4 |
| 6 | 6 | 7 | 8 | 9 | A | 0 | 1 | 2 | 3 | 4 | 5 |
| 7 | 7 | 8 | 9 | A | 0 | 1 | 2 | 3 | 4 | 5 | 6 |
| 8 | 8 | 9 | A | 0 | 1 | 2 | 3 | 4 | 5 | 6 | 7 |
| 9 | 9 | A | 0 | 1 | 2 | 3 | 4 | 5 | 6 | 7 | 8 |
| A | A | 0 | 1 | 2 | 3 | 4 | 5 | 6 | 7 | 8 | 0 |

Figure 2:
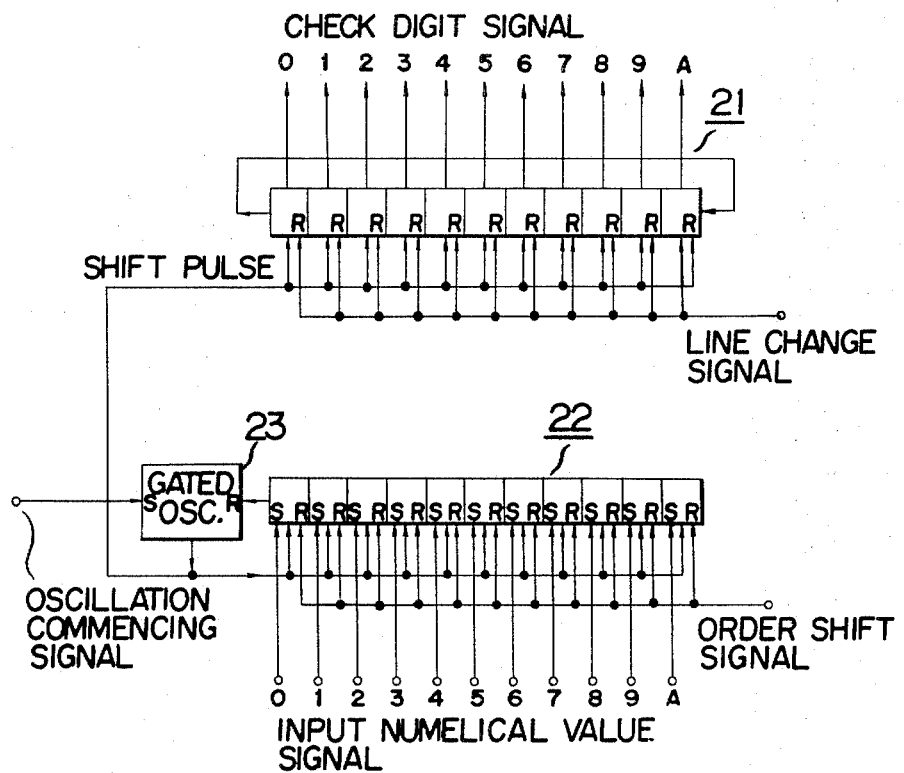
FIG. 2 is a block diagram of an essential portion of the circuit shown in FIG. 1.

FIG. 2 shows a mechanism for calculating the check digit by means of a shift register wherein 11 bit shift registers 21 and 22 are shifted towards the left as viewed in the drawing by shift pulses generated by a gated oscillator 23. Shift register 21 is of the rotationary shift register type wherein the last bit is fed back to the first bit.

In response to an input signal the shift register 22 sets a corresponding bit. For example, if the input signal were equal to 5, the sixth bit from left will be set. Then, when the gated oscillator 23 begins to oscillate both registers 21 and 22 commence to shift toward the left. When a signal set in the register 22 reaches the left hand end, its output will cause the oscillation of the gated oscillator 23 to cease. This will generate shift pulses of the number corresponding to the numerical value represented by the input signal whereby shift register 21 will be shifted left by the number corresponding to the number of shift pulses. The above cycle of operation is repeated at each sequential order of the input series to shift the shift register by the number equal to the sum of values of respective orders. When only the right bit of the shift register 21 is set to 1 at the commencement of each line which constitutes the information, the content of the register at the end of the line will represent the value of the check digit.

FIGS. 3 to 10 illustrate the construction of a checking device including the novel checking system capable of correcting errors and of recovering and reading rejected characters.

FIG. 3 shows the time relation of timing pulses P1 through P23 to be described later. These pulses are control timing pulses adapted to synchronously operate various devices to be described later according to the order of flow of signals and to enable utilization of the adder and multiplier on the basis of time division. These pulses are generated by utilizing clock pulses as the reference. The spacing between clock pulses is determined by the response speed of the device circuit and in the usual case of minimum spacing is limited by the response speed of the multiplier. As the circuit for generating pulses P0 and P1 through P23 can be readily constructed by the combination of well known counter, gate circuit and the like, it is believed unnecessary to describe it in detail. A circuit termed as the addition memory circuit in the following description functions to enable a gate in response to a prescribed timing pulse to send an input signal of binary digits to an independent adder utilizing 11 as a modulus, to set a temporary memory circuit in response to the output of the adder and to hold the output until it is set next time. A circuit termed as a multiplying memory circuit is a circuit which provides the same function as the addition memory circuit by means of a multiplier utilizing 11 as the modulus instead of an adder. For the sake of clearness, wirings to and from the adder and multiplier are omitted from the drawing. In the momentary memory circuit, there is a case wherein it is required to reset to 0 or off the content thereof at the time of commencement of the operation of all devices, but wirings adapted to send this reset pulse are also omitted for the sake of simplicity.

A buffer memory 101 shown in FIG. 4B serves to receive binary signals (in the following these signals are represented by 0, 1, 2 . . . corresponding to respective digits) through a terminal A1 corresponding to digits of respective orders that are read out by a character reading apparatus (not shown). Memory 101 also serves to memorize (or store) these signals, and then send out the content to an output conductor B1 in the order of respective sequential orders of the input digit series in response to the read out pulses P1 sent of the number equal to the number of digits of the digit series. In this case rejected characters encountered during reading are being stored by a specially assigned binary signal R. A rejection detecting gate 104 receives signal B1 as in the input and operates to send 0 to the output conductor B4 when the signal is R. Concurrently therewith a pulse is sent to an output conductor B5. Further it operates to freely pass input signals other than R to the output conductor B4 but not send any pulse to B5. Coefficient generating circuits 102 and 103 operate to respectively generate coefficient series II and III corresponding to respective orders in response to a timing pulse P1 and successively supply these coefficient series to output conductors B2 and B3 according to the respective orers. A rejected order coefficient setting circuit 116 operates to count the number of pulses received from the conductor B5 and to supply an ON signal to an output conductor B18 when the number of timing pulses P23 is equal to 0 or when the number of rejected characters is zero at the completion of reading out all digits in each line, that is when timing pulse P23 is received, whereas to supply an ON signal to an output conductor B17 when the number is larger than 3. In cases other than the above described case conductors B17 and B18 provide OFF signals. The circuit 116 also functions as a switching circuit to transfer a signal received from a conductor B2 to a conductor B19 upon receipt of the first pulse from the conductor B5, while at the same time to transfer a signal received from conductor B3 to conductor B21. Further upon receipt of the second pulse from conductor B5 it will transfer the signal from conductor B2 to conductor B20 and transfer the signal from conductor B3 to conductor B22.

Figure 5:
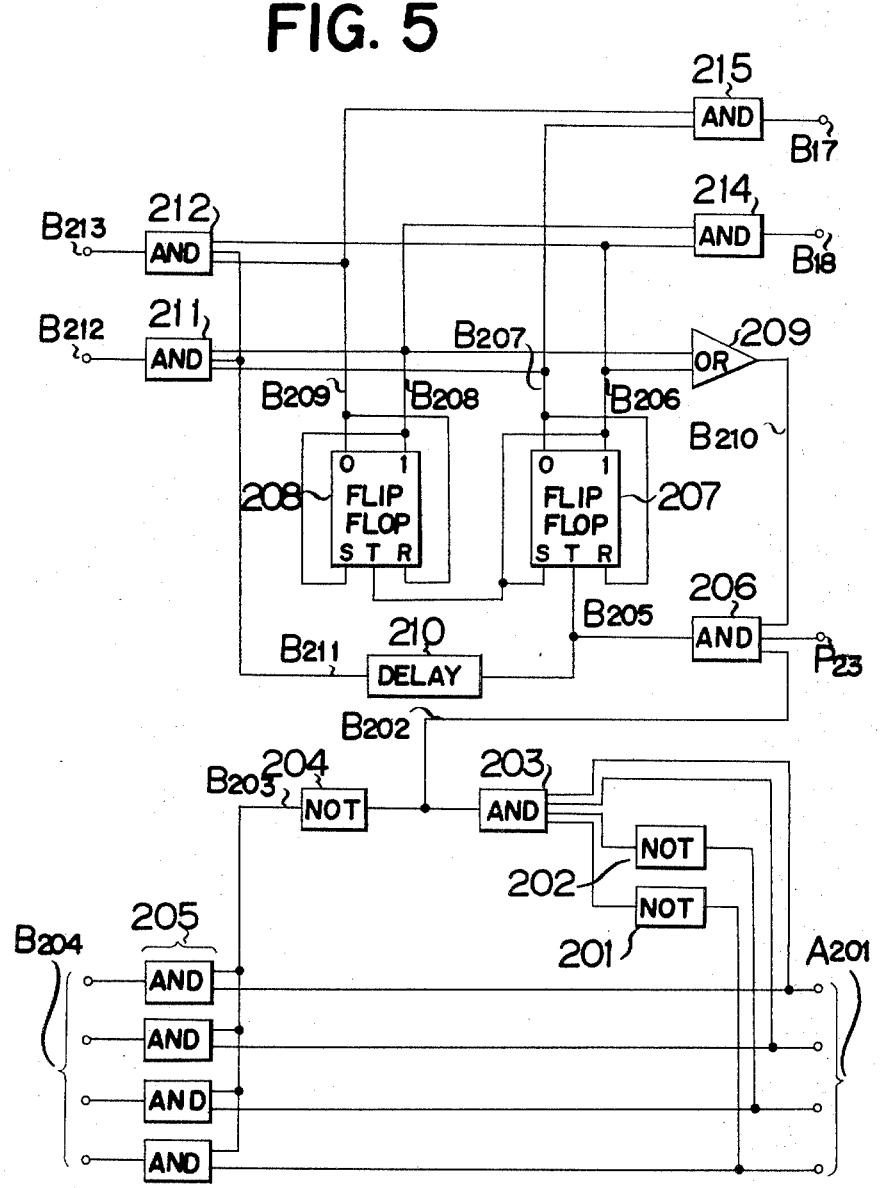
FIG. 5 shows in detail the rejection detecting gate and the rejection order coefficient setting circuit shown in FIG. 4A.

FIG. 5 shows the detail of said rejection detecting gate 104 and said rejected order coefficient setting circuit 116. Binary signals corresponding to respective digits are represented by four bit signals because it is only required to discriminate 13 digits including from 0 to A and the rejected character. In this detailed figure, 0 is represented by a binary signal (0, 0, 0, 0,) and the rejected character by a binary signal (1, 1, 0, 0,).

A group of input terminals A201 is provided to correspond to input terminals of rejection detecting gate 104 to receive an output B1 from the buffer memory 101. Reference numerals 201 and 202 represent inverter circuits which act to supply an output signal obtained by inverting 0 and 1 of a low two bit signal supplied to input terminal group A201. A four input AND circuit 203 is provided to add an upper two bit signal supplied to input terminal group A201 and the output from inverter circuits 201 and 202 thus providing an output B202. When the input terminal group A201 receives a rejected input signal or a binary signal (1, 1, 0, 0,) the output B202 will become ON (or 1) whereby the rejected character is detected. The output B202 corresponds to the output B5 from rejection detecting gate 104 shown in FIG. 4B. An inverter circuit 204 functions to supply the inverted signal of output B202 as the output B203. A group of AND circuits 205 operates to gate the signal from the input terminal group A201 under the control of the signal B203. Thus, these AND circuits freely transmit the input signal where the signal B203 is ON, whereas when the latter is OFF (or 0) provide all zeros or (0, 0, 0, 0,) as the output B204. Thus, when B203 is OFF, or when a rejected character is detected input signals from input terminal group A201 are supplied as "0." The output B204 corresponds to the output B4 from the rejection detecting gate 104 shown in FIG. 4B. From the foregoing description it will be obvious that all functions of the rejection detecting gate 104 are fully manifested.

The reference numerals 207 and 208 represent set-reset type flip-flop circuits which comprise a binary counter which counts the number of rejected characters. In the drawings S represents an input set terminal, R an input reset terminal, T a terminal for write pulses, 0 an 0-output terminal when the flip-flop circuit is in the reset state and 1 an 1-output terminal when the flip-flop circuit is in the reset state.

It is now assumed that both flip-flop circuits 207 and 208 are initially set to 0 (or reset). Then outputs B206 and B208 from flip-flop circuits 207 and 208 are both 1, and outputs B207 and B209 are both 0. The reference numeral 209 represents an OR circuit having two inputs adapted to supply to the output conductor B210 an OR output of outputs B206 and B208 from flip-flop circuits 207 and 208. As a consequence OR circuit 209 will provide 0 to the output conductor B210 only when flip-flop circuits 207 and 208 are both ON. An AND circuit 206 obtains the AND of outputs B202 and B210 and timing pulse P23 to provide an output B205. Timing pulse P23 is transmitted to a conductor B205 only when B202 and B210 are rendered to assume 1. A delay circuit 210 operates to delay the pulse on the conductor B205 by an interval required for the inverting operation of flip-flop circuits 207 and 208 thus providing an output B211. In other words, this delay circuit is an auxiliary means for preventing malfunction caused by a race condition and is not provided by the requirement of the novel system. AND circuits 211 and 212 provide an output respectively for conductors B212 and B213 only when flip-flop circuit 207 is ON and flip-flop circuit 208 is OFF or vice versa.

When the result of reading does not contain any rejection, output B202 of the AND circuit 203 would not assume 1 so that write pulse B205 would not be created irrespective of the state of timing pulse P23 whereby both flip-flop circuits 207 and 208 are maintained in their OFF state. As a consequence, the output B14 of the AND circuit B214 utilising B206 and B208 as the input signals is 1 (ON) whereas the output B215 of the AND circuit 215 utilising B207 and B209 as the input signal is 0 (OFF). Output B214 corresponds to output B18, and output B215 to output B17, respectively, shown in FIG. 4B.

When the first rejected character is detected by the AND circuit 203, the output B202 will become ON and the timing pulse P23 will be sent to conducor B205 through AND circuit 206, whereby flip-flop circuit 207 will invert to the ON state. At this time B206 and B209 will be "0" and B207 and B208 will be "1." As a consequence B214 will become OFF and the input condition of AND circuit 211 will be opened to pass the output pulse B211 of the delay circuit 210 thus providing an output B212. This output B212 causes the coefficient signal B2 shown in FIG. 4 to be stored in the temporary memory circuit 118 shown in FIG. 4 and B3 to be written in 120.

Upon detection of the second rejected character, a write pulse B205 is generated in the same manner to invert flip-flop circuit 207 to again assume the OFF state. Output B206 of the flip-flop circuit 207 causes the flip-flop circuit 208 to invert to the ON state. As a consequence, B214 and B215 are still maintained at their OFF state, AND circuit 211 is closed, whereas AND circuit 212 is opened so that the signal B211 is supplied to conductor B213 through 212 as the output.

Figure 6:
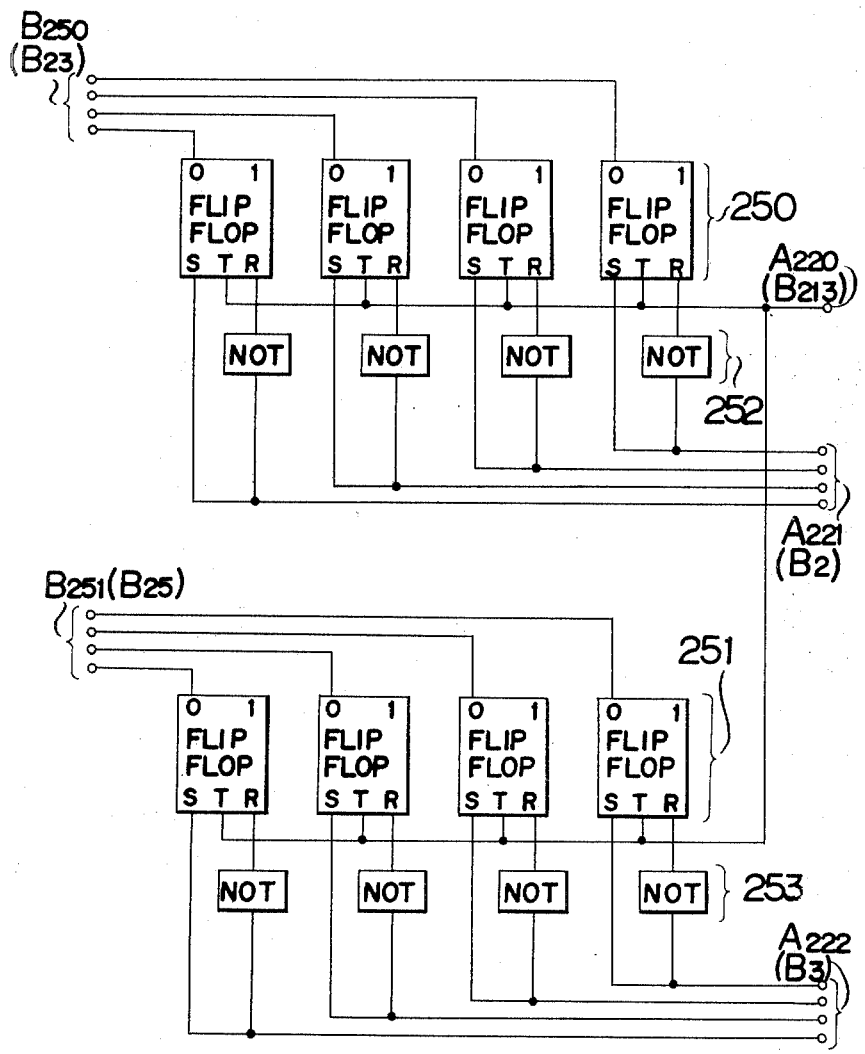
FIG. 6 is a block diagram showing an essential portion shown in FIG. 5.

Turning now to FIG. 6, an input terminal A220 is connected to receive output B212 shown in FIG. 5 to supply a write pulse to flip-flop circuit groups 250 and 251. An input terminal group A221 receives the output B2 from the coefficient generating circuit 102 shown in FIG. 4B while an input terminal group A222 receives the output B3 from 103 shown in FIG. 4B. These terminal groups are connected to input terminals of flip-flop circuit groups 250 and 251, respectively, directly or via inverter group 252 and 253. Consequently when an input terminal A220 receives a write pulse, signal B2 shown in FIG. 4B will be written in the flip-flop circuit group 250 while the signal B3 in the flip-flop circuit group 251 is to be stored therein. Flip-flop circuit groups 250 and 251 respectively correspond to temporary memory circuits 118 and 120 shown in FIG. 4B. Further, outputs 250 and 251 respectively correspond to outputs B23 and B25 shown in FIG. 4B. With this arrangement coefficients of coefficient series II and III corresponding to the sequential order containing the first rejected character are stored. Upon occurrence of the second rejected characters signals B24 and B26 shown in FIG. 5 can be produced as the write pulse by an identical circuit arrangement.

If additional rejected characters were detected, the flip-flop circuit 207 will become ON in the same manner as above described whereby the output B215 from the AND circuit 215 will become ON. Concurrently therewith the output B210 from the OR circuit 209 will become 0 (OFF) and the AND circuit 206 will inhibit sending a write pulse B205 even when additional rejected characters are detected. Thereafter, flip-flop circuits 207 and 208 are maintained in their set state.

It will thus be apparent that FIGS. 5 and 6 show the details of the rejected order coefficient circuit 116.

Referring again to FIG. 4B temporary memory circuits 118 and 120 are reset to "0" beforehand, and will be set to values B19 and B21 upon receipt thereof to maintain these values. Thus, coefficients of coefficient series II and III corresponding to an order containing the first rejected character are stored. The contents of the coefficients are supplied to outputs B23 and B25, respectively. Similarly, coefficients of the coefficient series II and III corresponding to the second rejected character are stored in temporary memory circuits 119 and 121 respectively. A complement gate 122 comprises a gate matrix circuit, which in response to signal B24, supplies a signal corresponding to the complement of 11 of that signal (hereinafter termed as the complement signal) to an output conductor B27. An addition memory circuit 124 calculates the sum of signals B23 and B27 in response to a timing pulse P15, temporarily stores the sum, and then provides it to output B29. A reciprocal gate 126 comprises a gate matrix which supplies an output B36 of a signal corresponding to the inverse value of digit represented by the signal B29 (hereinafter termed as the reciprocal signal). However, so long as the signal B29 is "0," the reciprocal gate 126 operates to supply "0" to a conductor B36 as the reciprocal signal while at the same time it supplies an ON signal to the output conductor B35. Each of temporary memory circuits 120 and 121, complement gate 123, addition memory circuit 125 and reciprocal gate 127 provides the same function as above for B21 and B22. In response to a timing pulse P4 the addition memory circuit 107 operates to obtain the sum of B4 and the output B8 of the content of its own memory and then again stores said sum in its memory circuit. This temporary memory circuit is reset to 0 beforehand. For this reason, sums of signals B4 are successively accumulated and this content is supplied to B8. Multiplying memory circuit 105 calculates the product of signals B4 and B2 in response to a timing pulse P2 and stores the product in its own temporary memory circuit. The content thereof is supplied to the output B6. In response to a timing pulse P5, the addition memory circuit 108 calculates the sum of the signal B6 and the output B9 of its own memory content B9, and again stores the sum in its own temporary memory circuit. The temporary memory circuit is reset to "0" beforehand. By the operation of 105 and 108, the weight sum of coefficient series II contained in the coefficient generating circuit 102 and the digit series except the digits corresponding to a rejected character in the buffer memory 101 are successively stored in the addition memory circuit 108. In response to a timing pulse P7 the multiplying memory circuit 110 calculates the product of signals B27 and B28 and temporarily stores the products. The content thereof is supplied to the output B11. In response to a timing pulse P9, the addition memory circuit 112 calculates the sum of signals B9 and B11 and temporarily stores the result of calculation, the content being provided to an output B13. Similarly, in response to a timing pulse P11 the multiplying memory circuit 114 calculates the product of signals B36 and B13 and temporarily stores the result of calculation, the content being supplied to an output B15. Multiplying memory circuit 106, addition memory circuit 109, multiplying memory circuit 111, addition memory circuit 113 and multiplying memory circuit 115 provide identical functions to B3, B28 and B38 as said elements 105, 108, 110, 112 and 114. In response to a timing pulse P13, a comparator circuit 129 effects comparison between output B15 of 114 and output B16 of 115 to send a signal to an output conductor B57 when said outputs B15 and B16 coincide and at the same time causes output B31 to become OFF. Whereas when said signals do not coincide the comparator circuit 129 provides an ON signal to an output conductor B31. However in the case when the comparator circuit receives an ON signal either from B35 or B37, it will directly send signal B16 or B15 to an output conductor B57 without effecting the comparison of these signals.

Figure 4A:
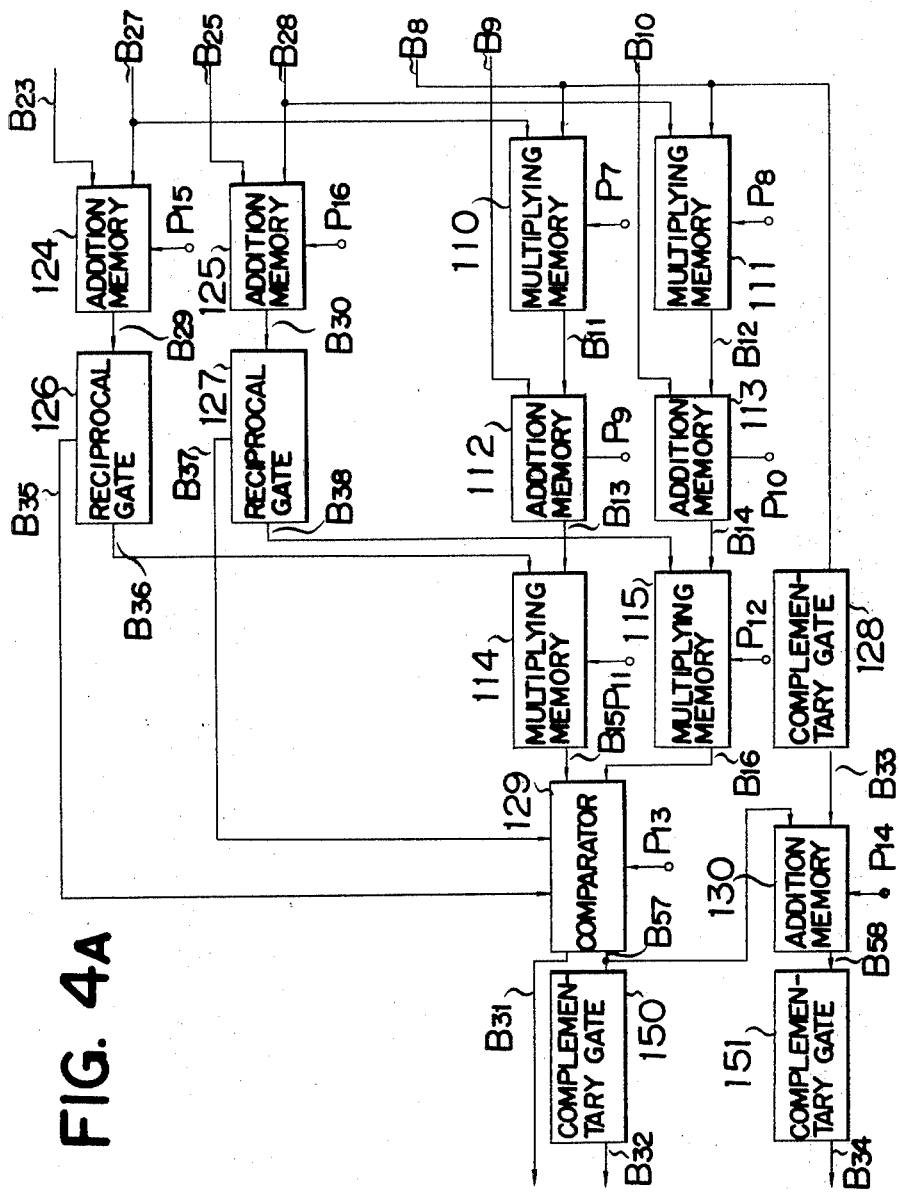
FIGS. 4A and 4B are block diagrams illustrating one embodiment of this invention for detecting and restoring to readable conditions erroneous codes as well as rejected codes.
Figure 7:
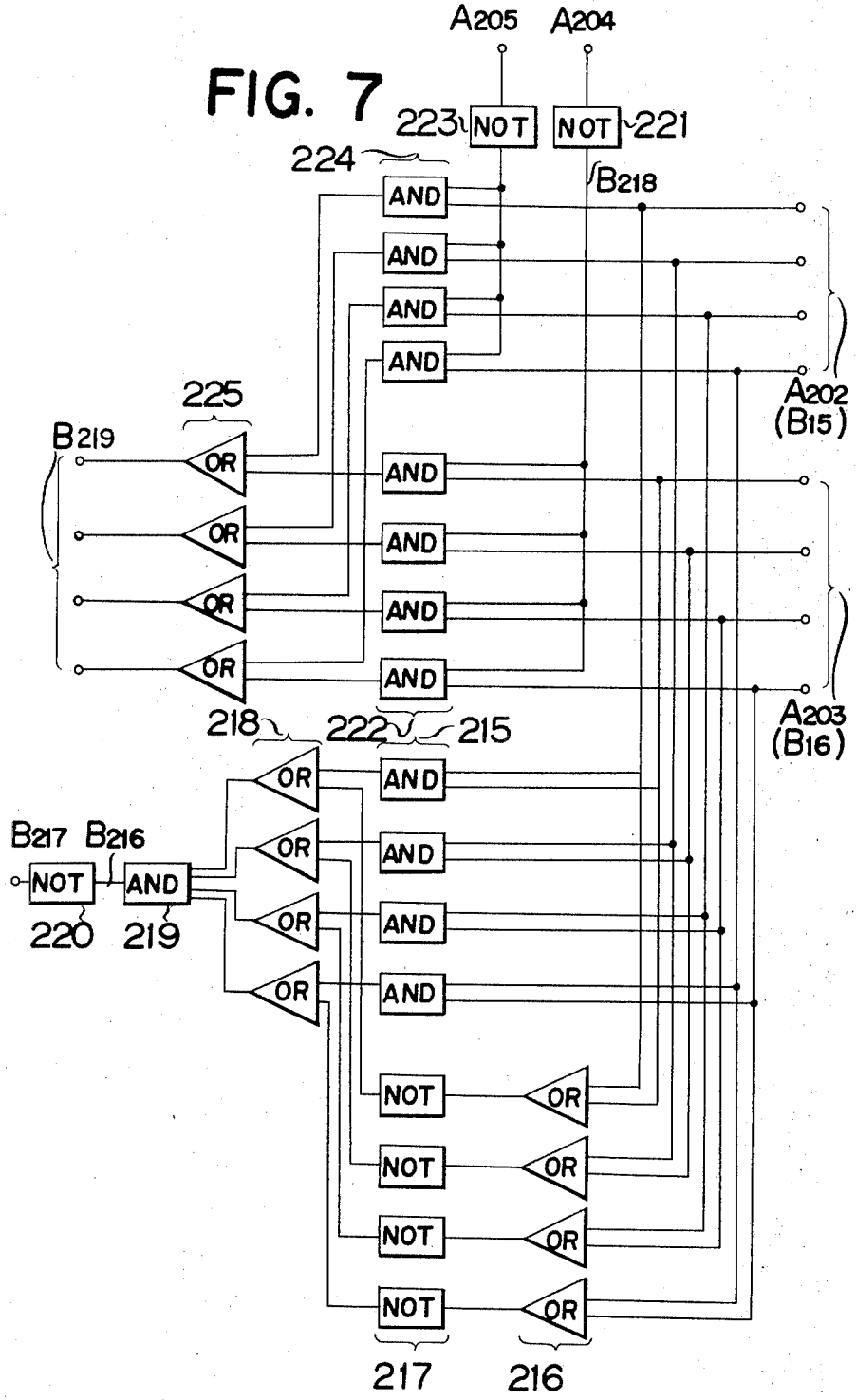
FIG. 7 shows in detail the construction of the comparison circuit shown in FIG. 4B.

FIG. 7 shows the details of the comparator circuit 129 shown in FIG. 4A.

Input terminal groups A202 and A203 respectively receive binary signals B15 and B16 shown in FIG. 4A as input signals. An AND circuit group 215 detects whether both signals of corresponding orders received at terminal groups A202 and A203 are equal to 1 or not. An OR circuit group 216 and an inverter circuit group 217 detect whether both signals of the corresponding order at terminal groups A202 and A203 are equal to 0 or not. An OR circuit group 218 receives outputs from AND circuit group 215 and inverter circuit group 217 to provide a 1 as its output when either one of groups 215 and 217 is ON, or signals of corresponding signals at input terminal groups A202 and A203 coincide with each other. An AND circuit 219 causes output B216 to become ON when all of the outputs from the OR circuit group 218 are 1. Thus the output B216 is ON when input signals from input terminal groups A202 and A203 perfectly coincide. This signal B216 is inverted by an inverter circuit 220 to provide an output signal B217 corresponding to an output B31 of the comparator circuit 129 shown in FIG. 4.

An input terminal A204 is arranged to receive an output B37 from the reciprocal gate 127 shown in FIG. 4A. When this signal B37 is ON (or 1), the output signal B218 is caused to become 0 by the action of an inverter circuit 221. An AND circuit group 222 operates to gate signals from an input terminal group under the control of signal B218. When output signal B218 is 0, all output signals become 0. An input terminal A205 receives an output B35 from the reciprocal gate 126 shown in FIG. 4A. An inverter circuiter 223 and an AND gate group 224 operate upon signals from the input terminal group A202 in the same manner as said inverter circuit 221 and said AND gate group 222. An OR circuit group 225 operates to provide an output B219 by taking the OR of output signals of the orders respectively corresponding to the AND circuit groups 222 and 224. With the circuit arrangement described above an output signal B219 is obtained from the input terminal group A202 when the input to the input terminal A204 is ON and that to the input terminal A205 is OFF, whereas in the opposite case the output signal B219 is obtained from the input terminal group A203. When inputs to input terminals A204 and A205 are both OFF, the same signal as the input signal is obtained as the output B219 when input signals from input terminal groups A202 and A203 coincide with each other.

Thus, the circuit shown in FIG. 7 provides all functions of the comparator circuit 129 shown in FIG. 4A. Referring again to FIG. 4A by proper selection of coefficient series II and III there is no chance that B35 and B37 provide simultaneously ON signals. The complement gate 128 provides a complement signal of the output B8 from 107 to the output conductor B33. In response to a timing pulse P14, the addition memory circuit 130 calculates the sum of signals B57 and B33 and temporarily stores this sum, and the content thereof is supplied to an output conductor B58. Complement gates 150 and 151 respectively supply complement signals of B57 and B58 to conductors B32 and B34.

The operation of the above-described apparatus will now be described with reference to the above examples.

(1) Recovery of one rejected digit: Suppose that the digit 4 in the third order in the digit series shown in Table 6 is rejected and that it is represented by $x$. By utilizing the second coefficient series, the value of $x$ can be obtained from thet following equation $$3x = 11 - (1\cdot6 + 2\cdot3 + 4\cdot9 + \ldots 6\cdot5 + 3) \bmod 11 \quad (21)$$

Figure 4B:
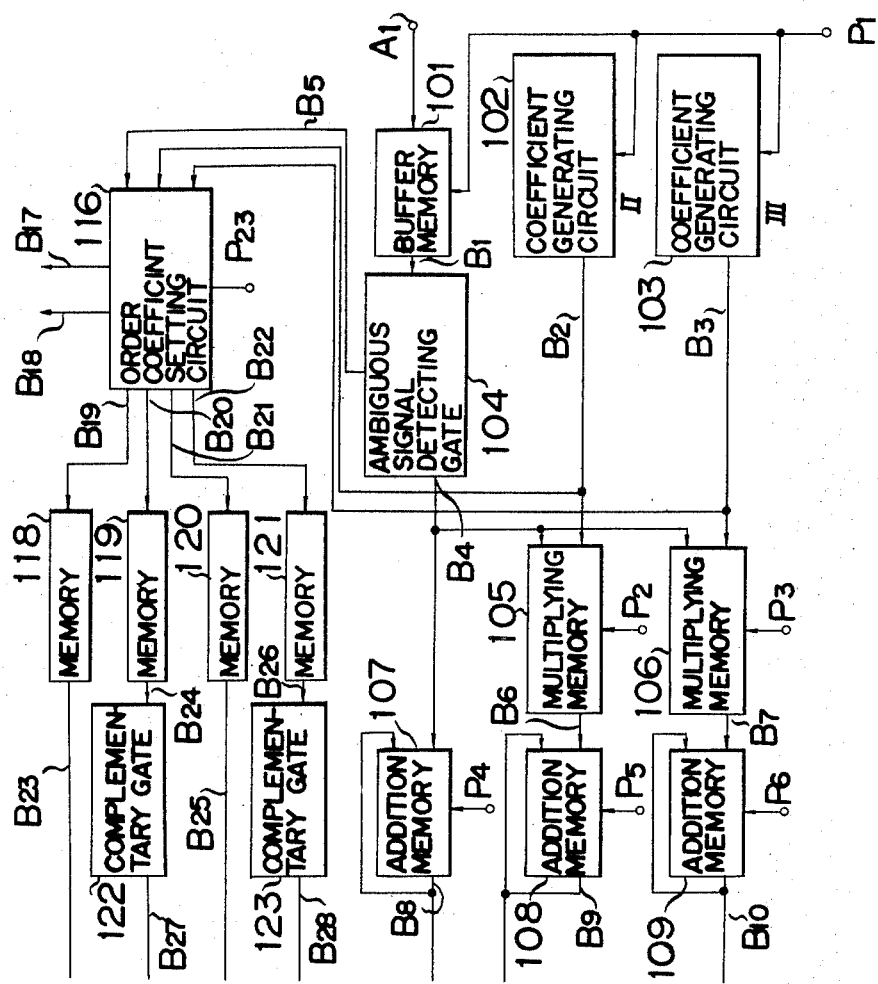

In this case the rejected order in the output digit series of the buffer memory 101 is firstly detected by means of the rejection detecting gate 104 shown in FIG. 4B and the coefficient 3 of the output from a coefficient generating device corresponding to this order is stored in the temporary memory circuit 118 by the action of the rejected order coefficient set circuit 116. Simultaneously therewith, the corresponding coefficient of the coefficient generating circuit 103 is stored in the temporary memory circuit 120. The rejected digit in the digit series from the buffer memory 101 is replaced by 0 by the action of the rejection detecting gate 104 and is supplied to addition memory circuit 107 and multiplying memory circuit 105. The multiplying memory circuit 105 simultaneously receives output from the coefficient generating circuit 102 to effect multiplication with said digit series and the results of multiplication are successively sent to the addition memory circuit 108 which calculates the sum by utilizing 11 as the modulus. Thus the multiplying memory circuit 105 and the addition memory circuit 108 cooperate to calculate the weight sum of the digit series and the coefficient series II from the rejection detecting gate 104, which are shown in the bracket in the right hand side of Equation 21. This result is supplied to another addition memory circuit 112, which simultaneously receives the output of the multiplying memory circuit 110 which calculates the product of the content of addition memory circuit 107 and that of the temporary memory circuit that is supplied through the complement gate 122. However this output is zero because the content of the temporary memory circuit 119 is zero. As a result the output of the addition memory circuit 108 directly appears on the output of the addition memory circuit 112 which is equal to the right hand side of said Equation 21. The output from the addition memory circuit 108 is supplied to the multiplying memory circuit 114. On the other hand, the content "3" of said temporary memory circuit 118 is added to the complement "0" of the temporary memory circuit 119 by the action of the addition memory circuit 124. The result of addition is converted into its inverse by means of the reciprocal gate 126 (in this case too, the inverse is the one that utilizes 11 as the modulus, and the inverse of 3 is 4 as shown in Table 7) and the converted reciprocal is supplied to said multiplying memory circuit 114. Accordingly on the output of the multiplying memory circuit 114 appears a quotient obtained by dividing the right hand side of said Equation 21 with 3 or the value of $x$.

Similarly the rejected digit $x$ can be calculated from the digit series III by a system comprised by a coefficient generating circuit, multiplying memory circuits 106, 111 and 115 and addition memory circuits 109 and 113. The results calculated by these two systems are compared by the comparator circuit 129 and when both values coincide, they are supplied to the output conductor B32 via a complement gate 50. When said two values do not coincide an ON output is generated on the other terminal B31 of the comparator circuit 129. In this case the presence of an error can be detected in the output digit series from the buffer memory 101 in addition to rejected digits.

(2) Recovery of two rejected digits: If rejected characters are denoted by $x$ and $y$ respectively as above described, the value of the right hand side of Equation 8 is obtained at the output B8 of the addition memory circuit 107 shown in FIG. 4 and that of the right hand side of Equation 9 is obtained on the output B9 of the addition memory circuit 108. Coefficients 1 and 6 of coefficient series II of an order containing $x$ and $y$ are stored in the temporary memory devices 118 and 119. The coefficient 6 is converted into a complement $-6$ ($\equiv 5$) by means of the complement gate 122 and this complement is multiplied by said output B8 by the action of the multiplying memory circuit 110. This is accomplished by multiplying both sides of Equation 8 with $-6$ ($\equiv 5$). Then the output of the multiplying memory circuit 110 and the output of the addition memory circuit 108 are added by the addition memory circuit 112, and the content of the temporary memory circuit 118 and the output of the complement gate 122 are added by the addition memory circuit 124. This accomplishes subtracting Equation 9 from Equation 8. The reciprocal gate 126 provides an inverse of the difference of coefficients obtained by subtracting the left hand side of Equation 9 from that of Equation 8, and the result is multiplied by the output from the addition memory circuit 112 by the action of the multiplying memory circuit 114. As a consequence the value of $x$ is obtained on the output B15 of the multiplying memory circuit 114. Coefficients of coefficient series III corresponding to orders containing $x$ and $y$ are stored in temporary memory circuits 120 and 121 and a simultaneous equation of the first degree similar to that shown above is solved by using the contents of said memory circuits 120 and 121 and content of the addition memory circuit 109, and the value of $x$ thus obtained appears on the output of the multiplying memory circuit 115. The values of $x$ are compared by the comparator circuit 129 and when they coincide, their values are taken out as an output through a complement gate 150 which is provided for adjusting positive and negative signs during operation. The value of $y$ is obtained on the output B34 by adding the value of $x$ to the complement of the content of the addition memory circuit 107.

(3) Detection of errors when one or two digits are rejected: In this case outputs B17 and B18 of the rejected order coefficient set circuit 116 shown in FIG. 4B are both zero but outputs of the multiplying memory circuits 114 and 115 do not coincide. As a result the output B31 of the comparator circuit becomes ON thus indicating the presence of an error.

The above described arrangement gives outputs shown in Table 12 when the above described operation is completed.

TABLE 12

| Output condition | B17 | B18 | B31 | B8 | B9 | B10 | B23 | B25 | B24 | B26 | B32 | B34 |
|---|---|---|---|---|---|---|---|---|---|---|---|---|
| Rejected character none | Off | On | Off | $l$ | $m$ | $n$ | 0 | 0 | 0 | 0 | 0 | 0 |
| Rejected character one | Off | Off | Off | $l$ | $m$ | $n$ | $a$ | $c$ | 0 | 0 | $x$ | * |
| Rejected character two | Off | Off | Off | $l$ | $m$ | $n$ | $a$ | $c$ | $b$ | $d$ | $x$ | $y$ |
| Rejected character and error | Off | Off | On | $l$ | $m$ | $n$ | $a$ | $c$ | $b$ | $d$ | * | * |
| Rejected character more than three | On | Off | * | $l$ | $m$ | $n$ | $a$ | $c$ | $b$ | $d$ | * | * |

In this table $l$ represents the sum of numerical values read of all digit series, by taking 11 as the modulus, $m$ the weight sum of coefficient series II and the digit series by utilizing 11 as the modulus, $n$ the weight sum of coefficient series III and the digit series by utilizing 11 as the modulus. $a$ and $c$ respectively represent values of coefficients of coefficient series II and III at positions corresponding to orders containing the first ambiguous character, $b$ and $d$ respectively represent values of coefficients of coefficient series II and III at positions corresponding to orders containing the second rejected characters. $x$ represents the numerical value of the position containing the first rejected character that is recovered and $y$ that of the position containing the second rejected character. A symbol * represents signals of no particular meaning not employed in this system. Where the signal B17 is ON, rejected characters present at more than three positions so that such a condition is impossible to recover and the input series is treated as rejected, where the signal B18 is ON there is no rejected character generated and if no error is detected by an error detector to be described later, all digit series are accepted. Further, when the signal B31 is ON a rejected character and an error occur simultaneously. Since recovery is impossible, this digit series is rejected. The case wherein all of signals B17, B18 and B31 are OFF indicates a possibility of recovery of rejected characters in which case the signal B32 or B34 will be inserted into an appropriate position in the order of digit series determined by signals B23, B24, B25 and B26 by the action of the circuit shown in FIG. 8. In this case, when the number of rejected characters is only one both signals B24 and B26 are 0 so that there is no corresponding order position, and insertion of signal B34 is impossible. When the signal B18 is ON, the error is detected by the action of an error detector to be described below.

Figure 9:
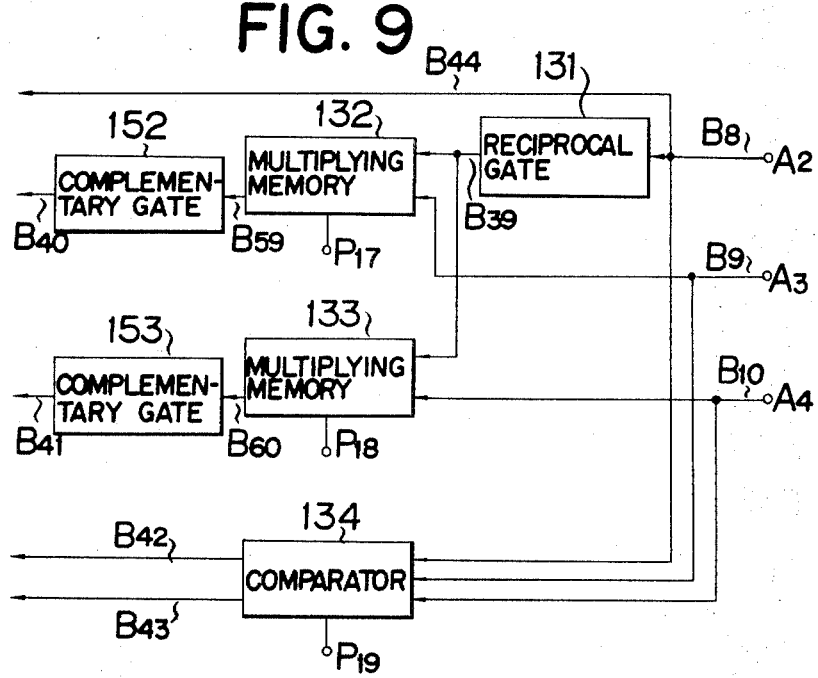
FIG. 9 shows a block diagram of an error detector embodying the principle of this invention.

FIG. 9 shows the error detector, wherein input terminals A2, A3 and A4 are connected to the outputs B8, B9 and B10 of 107, 108 and 109, respectively. In response to a timing pulse P19, a zero comparator circuit 134 provides an ON signal to the output conductor B42 when all of signals B8, B9 and B10 are "0," provides an ON signal to the output conductor B43 when signal B8 is "0" and either one or both of signals B9 and B10 are not "0," and provides an OFF signal to conductors B42 and B43 under conditions other than above two cases. A reciprocal gate 131 provides the reciprocal of signal B8 to an output conductor B39. A multiplying memory circuit 132 obtains a product of signals B39 and B9 in response to a timing pulse P17 and temporarily stores said product, the content thereof being supplied to an output conductor B59. Another multiplying memory circuit 133 performs identical functions upon signals B39 and B10 to provide its output to an output conductor B60. Conductor B44 is a mere extension of conductor B8, thus representing the content of the addition memory circuit 107. Complement gates 152 and 153 respectively provide complement signals of signals B59 and B60 to conductors B40 and B41. Finally, results shown in Table 13 are obtained.

TABLE 13

| Output condition | B42 | B43 | B40 | B41 | B44 |
|---|---|---|---|---|---|
| No error | On | Off | 0 | 0 | 0 |
| One error | Off | Off | $p$ | $q$ | $dx$ |
| Two or more errors | Off | On | * | * | * |

Figure 8:
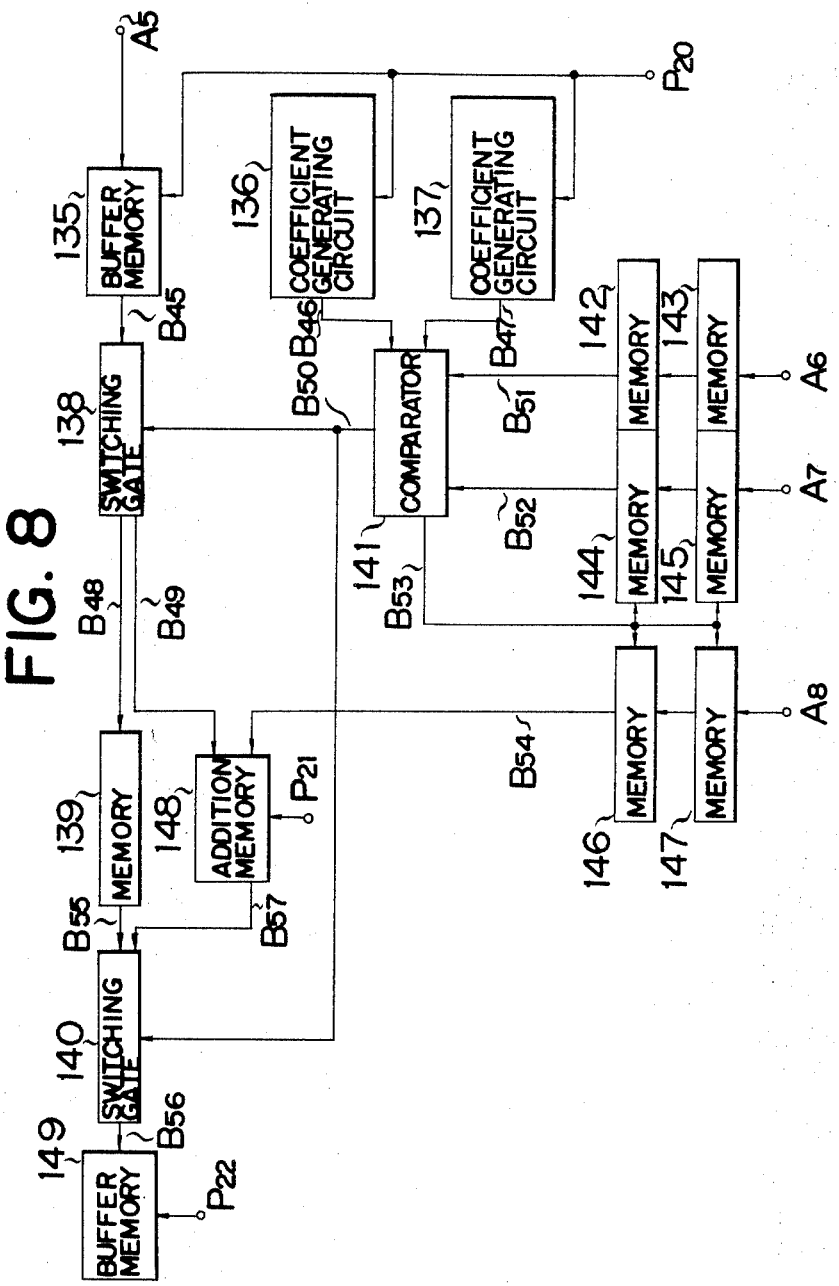
FIG. 8 shows a block diagram of a device embodying this invention for recovering rejected codes.

Under the condition wherein B18 is ON, if B42 is ON, there will be no error, whereas if B43 is ON, there will be more than two errors which are impossible to correct. Where both B42 and B43 are OFF, there is one error in which case the coefficient $p$ of coefficient series II corresponding to the position of error is given by B40 whereas the coefficient $q$ of coefficient series III corresponding to the position of error is given by B41 and the difference $dx$ of the numerical values varied by the error is given by B44. FIG. 8 shows an apparatus for writing rejected characters that are determined and to be recovered by the device described hereinabove.

A signal B4 is stored in a buffer memory 135 through a terminal A5 in synchronism with a timing pulse P1. More particularly, all digit series read out are retained except that the rejected character has been replaced by "0." Coefficient generating circuits 13.6 and 13.7 generate coefficients corresponding to respective orders. The same purpose can be attained by switching 102 and 103 shown in FIG. 4B. When B17, B18 and B31 are all in their OFF state contents of 118, 119, 120, 121 and outputs B32 and B34 are stored in temporary memory circuits 142, 143, 144, 145, 146 and 147, respectively, whereas where B18 is ON and B42 and B43 are OFF B40, "0," B41, "0," B44 and "0" are respectively written in said temporary memory circuits. Where B17, B18, B51, B42 and 43 do not satisfy the above described conditions no correction is made and the circuit shown in FIG. 8. does not operate. Signals are supplied to B45, B46 and B47 respectively from 135, 136 and 137 in response to a timing pulse P20 which is generated in a number corresponding to the number of orders of the digit series. A coefficient comparator circuit 141 effects comparison between B46 and B51 and between B47 and B52 to determine whether they are equal or not. When both pairs are equal in other words, when they coincide with the coefficient of the order which has received a and b, or c and d or p and q, the coefficient comparator circuit 141 will provide an ON signal to B50 and then send a shift pulse to B53. When one or both of said pairs are not coincident the coefficient comparator circuit 141 will render B50 to become OFF and not send any signal to B53. A switching gate 138 is a gate that passes a signal on B45 to B48 when B50 is OFF and passes a signal on B45 to B49 when B50 is ON.

Figure 10:
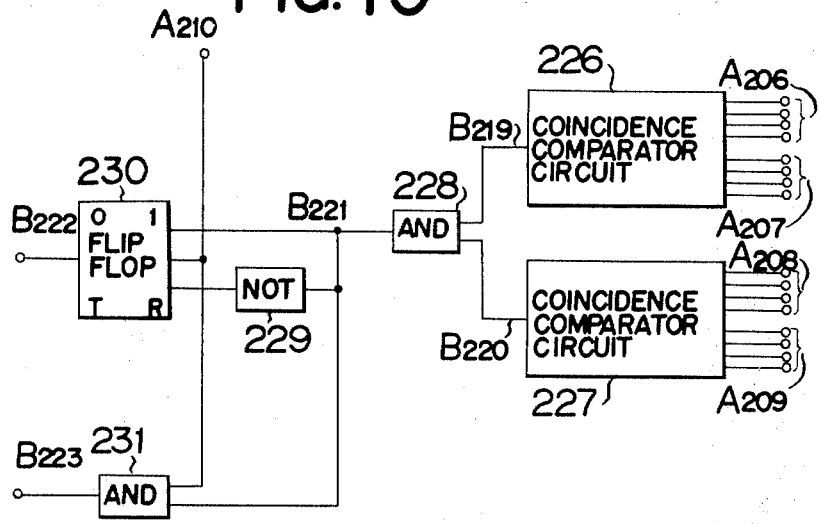
FIG. 10 is a block diagram of the coefficient comparison circuits shown in FIG. 8.

FIG. 10 shows the details of the coefficient comparator circuit 141 shown in FIG. 8. Input terminal groups A206, A207, A208 and A209 are connected to receive signals B46, B51, B47 and B52, respectively, shown in FIG. 8. Coincidence comparator circuits 226 and 227 are identical to those shown in FIG. 7 and are comprised by AND circuits 215 and 219, OR circuits 216 and 218 and inverter circuit 217. These comparator circuits operate to make output B219 ON, signals from input terminals A206 and A207 coincide each other whereas OFF upon noncoincidence. Similarly, they make output B220 ON when signals from input terminals A208 and A209 coincide each other whereas OFF upon noncoincidence whereby coefficients are compared. An AND circuit 228 operates to make output signal B221 ON when signals B219 and B220 are both ON. The signal B221 is supplied to a set terminal of a flip-flop circuit 230 while a signal inverted by an inverter circuit 229 is applied to a reset terminal of the flip-flop circuit 230. Upon receipt of a write pulse from input terminal A210, the flip-flop circuit 230 is set to the ON or OFF state according to the ON or OFF state of signal B221 to apply its output signal to an output conductor B222. As the write pulse, there may be utilized a signal which is delayed from the timing pulse 20 by a period corresponding to the delay in the operation of coefficient generating circuit 136 or 137 and coincidence comparator circuit 226 or 227. An AND circuit 231 operates to take an AND of signal B221 and the write pulse from input terminal A210 to provide an output B223. Signals B222 and B223 correspond to signals B50 and B53, respectively, shown in FIG. 8. Thus the circuit shown in FIG. 10, provides the function of the coefficient comparator circuit shown in FIG. 8a.

Referring to FIG. 8 a switching gate 140 operates to pass the signal to B55 to B56 when B50 is OFF and to pass the signal B57 to B56 when B50 is ON. An addition memory circuit 148 calculates the sum of signals B49 and B54 in response to a timing pulse P21 and then temporarily stores the calculated sum, the content thereof being sent to an output B57. Thus a corrected numerical value is being sent to B57. Correction of an error may be made by adding $dx$ to the original value. Inasmuch as the ambiguous character has been set to "0," addition of $x$ or $y$ results in the transmission of $x$ and $y$ without any modification. A temporary memory circuit 139 is provided for the purpose of maintaining synchronism with the coefficient comparator circuit 141 and operates to maintain the signal on B48 and supply it to the conductor B55 as an output. By the action of a shift pulse B53 sent from the circuit 141 the content of a temporary memory circuit 143 is transferred to a temporary memory circuit 142 while at the same time the contents of 145 and 147 are transferred to 144 and 146 respectively. Thus, at first, while the signals of numerical value of the first corrected digit are maintained in 142, 144 and 146, when correction is made, signals of numerical values of the second corrected digit are transferred to 142, 144, and 146. For this reason, signals of corrected digit series are successively applied to the final output B56 and these signals are sent to an output buffer memory 149 under the control of a timing pulse P22. After completion of sending out of all digit series when the contents of temporary memory circuits 144 and 142 are both "0," then it can be noted that the combination of $p$ and $q$ calculated by the error detector is not present in the combination of coefficient series II and III since more than two errors are not present in the digit series. In this case correction of errors is impossible and hence the input digit series should be rejected.

From the foregoing description it can be noted that according to this invention there is provided a system capable of detecting and correcting errors and recovering rejected characters in decimal digit series. In the above arrangement a portion or all of the buffer memory can be used commonly when it is switched according to time by means of a circulating register and the like. Further, a plurality of adders and multipliers may be used which may be operated in parallel with one or all of said addition memory circuits and multiplying memory circuits. The above described system can also be adopted for $n$-nary systems ($n$ being an integer) without any basic modification.

While the invention has been shown and described in terms of a preferred embodiment thereof it should be understood that many alterations and modifications may be made without departing from the spirit and scope of the invention as defined in the appended claims.

What is claimed is:
1. A code checking system comprising:
converting means receiving a character series for converting respective characters and rejected characters in said character series into predetermined corresponding digits and to successively supply said digits to an output;
coefficient generating means to successively generate predetermined coefficients corresponding to respective orders of said digit series supplied at said output of said converting means;
a rejected character detecting means coupled to the output of said converting means to successively pass the digit series supplied by said converging means and, during said passing, to detect the predetermined digit corresponding to respective rejected characters in said digit series and to convert said digit to a zero digit and to generate a detection pulse in response to each detection of a rejected character;
a weight sum calculating means responsive to the coefficient series supplied by said coefficient generating means and to the digit series supplied by said rejected character detecting means for calculating the weight sum of said coefficient series and said digit series by utilizing a predetermined prime member as the modulus;
a coefficient gating means responsive to each of said detection pulses supplied by said rejected character detecting means to pass coefficients in said coefficient series;

a coefficient memory means coupled to said coefficient gating means to store the coefficients corresponding to the orders containing said rejected characters supplied by said coefficient generating means through said coefficient gating means;

a rejected digit calculating means responsive to the contents of said coefficient memory means and to the results of calculation of said weight sum calculating means for calculating the digits corresponding to each of the rejected characters in said character series by executing a predetermined operation utilizing the contents of said coefficient memory means and said results of calculation;

a rejected order detecting means coupled to said rejected character detecting means and to said coefficient generating and memory means to detect the orders in the output digit series of said rejected character detecting means corresponding to the orders containing the rejected characters by comparing the coefficient series supplied by said coefficient generating means with the contents of said coefficient memory means; and recovering means responsive to the output of said rejected digit calculating means and to the output of said rejected order detecting means for restoring the results of calculation of said rejected digit calculating means into the orders of the output digit series of said rejected character detecting means specified by said rejected order detecting means.

2. A code checking system comprising:

converting means receiving a character series for converting respective characters in said character series into predetermined corresponding digits and to successively supply said digits in a series to an output;

a plurality of coefficient generating means to successively generate predetermined coefficients corresponding to respective orders of the digit series supplied at said output of said converting means;

a weight sum calculating means coupled to said coefficient generating means and to said converting means to calculate the weight sum of the coefficient series supplied by said coefficient generating means and the digit series supplied by said converting means by utilizing a predetermined prime number as the modulus;

an error detecting means responsive to the results of calculations of said weight sum calculating means for detecting the presence of errors in said output digit series of said converting means;

a coefficient calculating means responsive to the results of calculations of said weight sum calculating means and to the output of said error detector for calculating the coefficients in each of said coefficient series corresponding to the erroneous orders in said output digit series of said converting means;

an erroneous order detecting means comparing the coefficient series supplied by said coefficient generating means with the respective coefficients supplied by said coefficient calculating means to detect the orders containing the erroneous digit in said output digit series of said converting means;

an error calculating means responsive to the results of calculations of said weight sum calculating means for calculating the difference between said erroneous digits and correct digits corresponding thereto; and recovering means responsive to the output of said error calculating means and to the output of said converting means for correcting the erroneous digits to the correct digits by adding the results of calculation of said error calculating means to the digits contained in the erroneous orders in the output digit series of said converting means specified by said erroneous order detecting means.

3. A code checking system comprising:

a converting means receiving a character series for converting respective characters and rejected characters in a character series into predetermined corresponding digits and to successively supply said digits in a series to an output;

a plurality of coefficient generating means to successively generate predetermined coefficients corresponding to respective orders of said digit series supplied at said output of said converting means;

a rejected character detecting means coupled to said converting means to successively pass the digit series supplied by said converting means to an output and, during said passing, to detect the predetermined digit corresponding to respective rejected characters in said digit series and to convert said digit to a zero digit and to generate a detection pulse in response to each detection of a rejected character;

an addition means coupled to said rejected character detecting means to calculate the sum of the digit series supplied by said rejected character detecting means by utilizing a predetermined prime number as the modulus;

a weight sum calculating means responsive to the coefficient series supplied by said coefficient generating means and to the digit series supplied by said rejected character detecting means for calculating the weight sum of said coefficient series and said digit series by utilizing said predetermined prime number as the modulus;

a coefficient gating means responsive to each of said detection pulses supplied by said rejected character detecting means to pass coefficients in said coefficient series;

a coefficient memory means coupled to said coefficient gating means to store the coefficients corresponding to the orders containing said rejected characters supplied by said coefficient generating means through said coefficient gating means;

a rejected digit calculating means responsive to each of the rejected characters in said character series, to the contents of said coefficient memory means and to the results of calculation of said addition means and weight sum calculating means for calculation the digits corresponding to each of the rejected characters in said character series by executing a predetermined operation for solving a simultaneous equation of the first degree by utilizing the contents of said coefficient memory means and said results of calculation;

an error detecting means comparing the results of calculation of said addition means and said weight sum calculation means with a predetermined value when no detection pulse is supplied by said rejected character detecting means to detect the presence of errors in the output digit series of said converting means;

a coefficient calculating means responsive to the results of calculation of said addition means and said weight sum calculating means when said error detecting means detects said errors to calculate the coefficients in each of said coefficient series corresponding to the orders containing the erroneous digits in the output digit series of said converting means;

an error calculating means responsive to the results of calculation of said addition means and said weight sum calculating means to calculate the difference between the erroneous digits in the output digit series of said converting means and the correct digits corresponding thereto;

an order detecting means comparing the coefficient series supplied by said coefficient generating means with the respective coefficients selectively supplied by said coefficient memory means or said coefficient calculating means to detect the orders containing the rejected characters or the erroneous characters; and a recovering means responsive to the outputs of said converting means and to said digit and error calculating means to recover the output digit series generated by said converting means to complete the digit series by adding the results of calculation selectively supplied by said rejected digit calculating means and said error calculating means to the digits contained in the orders specified by said order detecting means in the digit series supplied by said rejected character detecting means.

4. The code checking system according to claim 3 wherein said rejected character detecting means comprises:

circuit means having at least a first inverter circuit coupled to the output of said converting means;

a first AND gate coupled to the outputs of said circuit means and to supply an output thereof to said coefficient memory means when said input signals correspond to the digit of rejected character;

a second inverter circuit coupled to the output of said first AND gate; and a second AND gate group receiving the outputs from said converting means and to pass said outputs under the control of the output of said second inverter circuit.

5. The code checking system according to claim 3 wherein said coefficient memory means and coefficient gating means comprise:

first and second flip-flop circuits of the set-reset type, each having a set terminal, a reset terminal and a write terminal;

an OR circuit coupled to said flip-flop circuits to provide OR outputs of respective ones of the output terminals of said first and second flip-flop circuits;

a first AND circuit group and a second three input AND circuit group respectively coupled to receive two outputs of said first and second flip-flop circuits;

a delay circuit;

a third AND circuit coupled to the output from said OR circuit, a source of a timing pulse and to the detection pulse output from said rejected character detecting means, the output of said third AND circuit being coupled to one input terminal of said three input AND circuit group via said delay circuit and the write terminal of said first flip-flop circuit;

an inverter circuit group; and a flip-flop circuit group, the write terminals thereof directly receiving the output of the AND circuit of said three input AND circuit group, and the set and reset terminals thereof receiving the output from said coefficient generating means directly and via said inverter circuit, respectvely.

6. The code checking system according to claim 3 wherein said rejected digit calculating means has a comparator circuit for comparing first results of said rejected digit calculating means calculated by utilizing one of said coefficient series with second results calculated by utilizing another one of said coefficient series, said comparator circuit comprising:

a first AND circuit group receiving said first results;

a second AND circuit group receiving said second results;

a first inverter circuit group coupled to and controlling said first and second AND circuit groups;

a third AND circuit group and a first OR circuit group respectively receiving said first and second results;

a second inverter circuit group inverting the output of said first OR circuit group;

a second OR circuit group receiving the outputs of said third AND circuit group and said second inverter circuit group;

a third OR circuit group receiving the output of said first and second AND circuit groups;

an AND circuit receiving the output of said second OR circuit group; and an inverter circuit inverting the output of said AND circuit.

7. The code checking system according to claim 3 wherein said order detecting means comprises:

a first coincidence comparator circuit coupled to receive a first coefficient series generated by said coefficient generating means, the coefficients in the first coefficient series being stored in said coefficient memory means or being operated on by said coefficient calculating means;

a second coincidence comparator circuit coupled to receive a second coefficient series generated by said coefficient generating means, the coefficients in the second coefficient series being stored in said coefficient memory means or being operated on by said coefficient calculating means;

a first AND circuit receiving the outputs from said first and second coincidence comparator circuits;

a second AND circuit receiving the output from said first AND circuit and a predetermined write pulse; and a flip-flop circuit having write, set and reset terminals, said set and reset terminals receiving the output of said first AND circuit directly and through an inverter circuit, respectively, and said write terminal receiving said write pulse.

References Cited

UNITED STATES PATENTS

| Re. 24,447 | 3/1958 | Bloch | 235—61 |
|---|---|---|---|
| 2,911,149 | 11/1959 | Rouche | 235—153 |
| 2,919,854 | 1/1960 | Singman | 235—153 |
| 3,022,950 | 2/1962 | Dirks | 235—153 |
| 3,040,985 | 6/1962 | Glaser et al. | 235—153 |
| 3,138,701 | 6/1964 | Davis | 235—153 |

EUGENE G. BOTZ, Primary Examiner

C. E. ATKINSON, Assistant Examiner

U.S. Cl. X.R.

235—153